United States Patent
Atcitty et al.

(10) Patent No.: US 7,239,044 B1
(45) Date of Patent: Jul. 3, 2007

(54) ENHANCED DISTRIBUTED ENERGY RESOURCE SYSTEM

(75) Inventors: Stanley Atcitty, Albuquerque, NM (US); Nancy H. Clark, Corrales, NM (US); John D. Boyes, Albuquerque, NM (US); Satishkumar J. Ranade, Las Cruces, NM (US)

(73) Assignee: Sandia Corporation, Albuquerque, NM (US)

( * ) Notice: Subject to any disclaimer, the term of this patent is extended or adjusted under 35 U.S.C. 154(b) by 456 days.

(21) Appl. No.: 11/008,035

(22) Filed: Dec. 9, 2004

(51) Int. Cl.
 *H02J 7/00* (2006.01)
 *H02M 7/48* (2006.01)
 *H02P 15/00* (2006.01)

(52) U.S. Cl. .......................... 307/66; 363/71

(58) Field of Classification Search .................. 363/65, 363/71, 95, 131, 142; 307/44, 48, 52, 58, 307/64, 66, 70, 80, 82, 85, 86
See application file for complete search history.

(56) References Cited

U.S. PATENT DOCUMENTS

| | | | |
|---|---|---|---|
| 3,875,494 A * | 4/1975 | Gyugyi | 363/67 |
| 4,725,740 A * | 2/1988 | Nakata | 307/64 |
| 6,255,008 B1 | 7/2001 | Iwase | |
| 6,369,461 B1 * | 4/2002 | Jungreis et al. | 307/46 |
| 6,522,955 B1 | 2/2003 | Colborn | |
| 6,670,721 B2 | 12/2003 | Lof et al. | |
| 6,738,692 B2 | 5/2004 | Schienbein et al. | |
| 6,745,105 B1 | 6/2004 | Fairlie et al. | |
| 6,806,589 B1 * | 10/2004 | Suttie | 307/73 |
| 6,815,932 B2 | 11/2004 | Wall et al. | |
| 6,949,843 B2 * | 9/2005 | Dubovsky | 307/64 |

\* cited by examiner

*Primary Examiner*—Matthew V. Nguyen
(74) *Attorney, Agent, or Firm*—Elmer A. Klavetter

(57) ABSTRACT

A power transmission system including a direct current power source electrically connected to a conversion device for converting direct current into alternating current, a conversion device connected to a power distribution system through a junction, an energy storage device capable of producing direct current connected to a converter, where the converter, such as an insulated gate bipolar transistor, converts direct current from an energy storage device into alternating current and supplies the current to the junction and subsequently to the power distribution system. A microprocessor controller, connected to a sampling and feedback module and the converter, determines when the current load is higher than a set threshold value, requiring triggering of the converter to supply supplemental current to the power transmission system.

14 Claims, 2 Drawing Sheets

ENHANCED DISTRIBUTED ENERGY RESOURCE SYSTEM

This invention was made with Government support under Contract No. DE-AC04-94AL85000 awarded by the Department of Energy. The Government has certain rights in the invention.

RELATED APPLICATIONS

"Method for Power Management," filed on Dec. 9, 2004 application Ser. No. 11/008,342 assigned to the same assignee as that of the present invention and fully incorporated herein by reference.

BACKGROUND OF THE INVENTION

The invention describes a power transmission system and, more particularly, to a distributed energy resource system enhanced to provided supplemental current when required to a power distribution.

Distributed energy resource (DER) systems consist of energy generation and storage systems placed at or near a power load center. Unlike large electric power plants, DERs are small in terms of capacity and are installed close to the consumer. Examples of DERs are fuel cells, microturbines and photovoltaic systems. These distributed resources can provide the consumer with better power quality and higher energy efficiency. A DER system also has the potential to mitigate transmission congestion, control price fluctuation, strengthen security and improve grid stability. Most DER systems are typically less than a megawatt in size. Such a limitation will degrade DER's transient roadability in case of large load switching, such as induction motor starting. Therefore, it is highly desirable to integrate a supplemental power conversion system (SPCS) into a DER system so that the over-loaded energy can be compensated by injecting supplementary current from a SPCS into the grid. A device is required which senses the DER current to detect the overload condition and triggers the SPCS inverter.

The implementation of distributed energy resource systems as a supplementary or stand-alone power source can achieve significant benefits in terms of economy and reliability, such as better power quality, higher energy efficiency and improved system stability. However, an isolated DER system will experience overload stress when transient inductive loads, such as motor starting, drawing excessive currents from the system. Such stress might cause severe voltage sag due to the over-current protection of the DER system itself. In many cases, the system protection scheme will shut down the DER system if the current is much higher than the DER system capability.

Required is a system and method for implementing a distributed energy resource system that has suitable capability to supply excess current demands and protect the integrity of the energy delivery system.

BRIEF DESCRIPTIONS OF THE DRAWINGS

DESCRIPTION OF SPECIFIC EMBODIMENTS

Figure 1:
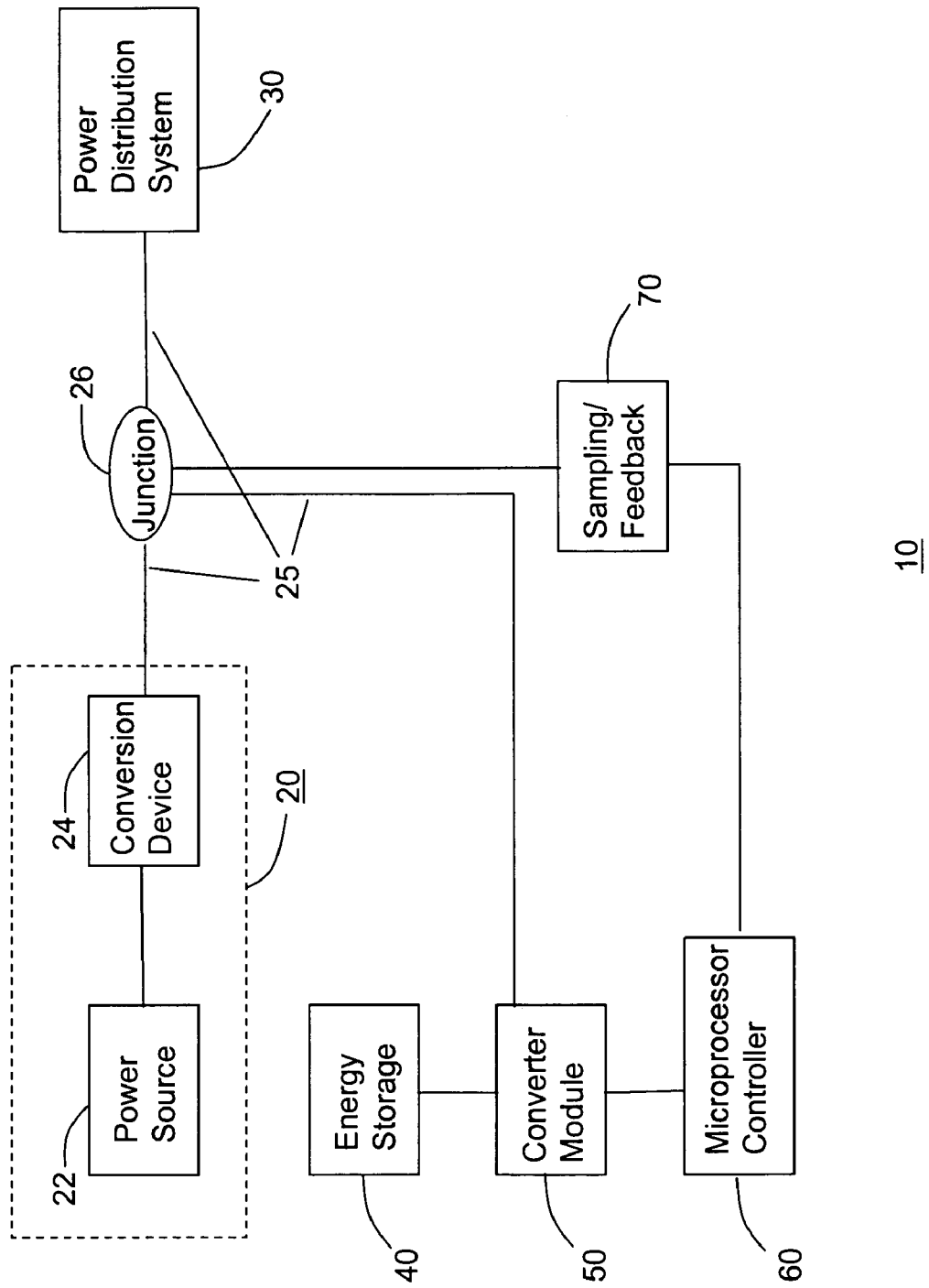
FIG. 1 shows an illustration of the modified DER system used in the method of the present invention.

A typical distributed energy resource (DER) system comprises a power source, such as a fuel cell, a microturbine or a photovoltaic source, that produces direct current that is subsequently converted to alternating current and distributed through some transmission means, such as an electrical cable, to a distribution power system. In the present invention, the approach to improving the transient roadability of a DER system is to integrate an energy storage device in a supplemental power conversion system (SPCS) module in parallel with the DER system, 20, comprising a power source, 22, and a conversion device or means, 24, as depicted in FIG. 1, to supply the excess current needed to the power distribution system, 30, in the transient overload period, providing a modified DER system. The SPCS solution generally consists of an energy storage device, 40, such as an electrochemical capacitor, a digital microprocessor-based digital control unit, 60, in communication with a sampling and feedback system, 70, and high-power electronic circuit converter modules, 50, utilizing a power semiconductor device such as insulated gate bipolar transistor (IGBT) converter circuits, a metal oxide semiconductor field-effect transistor (MOSFET), a gate turnoff thyristor (GTO), or other like device. The energy storage device, such as an electrochemical capacitor, provides energy storage and is connected to the direct current (DC) of the SPCS. The control unit monitors the DER system operating current and triggers the converter to deliver short-term energy into the power system when an overload conditions occurs. In general, the system has a power capacity of less than approximately 1 megawatt.

The power (or energy) source in the DER system can be categorized into either a mechanical energy source or a direct current (or electrical energy) source. The energy produced is converted in alternating current for transmission to a utility or power system by either a static power converter, a rotating power converter or a hybrid power converter. Typical power sources include a fuel cell, a photovoltaic system, a wind turbine, a microturbine, a Stirling engine, a combustion turbine, a superconducting magnetic energy storage system, a battery, a fly-wheel, an electrochemical capacitor and a compressed air system. The static power converter employs high power electronics circuit (such as an IGBT) controlled by digital microprocessors to invert the DC into three-phase alternating current (AC) outputs.

The SPCS consists of four major functional components, as depicted in FIG. 1 and electrically connected via some transmission means as shown, which illustrates the integration diagram of SPCS module within the modified DER system. The first is a DC energy storage device, 40, which is an ultra-capacitor or other storage medium providing an electrical connection by some transmission means (i.e., a DC link) to the converter stage, 50. The second component is a single or multiphase converter, 50, which is the major power conversion stage and includes in one embodiment IGBT modules and driver circuits, to generate AC output to the DER junction, 26, to which it is therefore electrically connected. Unlike the conventional converters that operate at comparatively high frequency, such as 5 kHz or 10 kHz and utilize a low-pass filter to obtain the AC component, the SPCS converter used in this approach is a simple 60 Hz low frequency (and generally square-wave, but can be triangular, sinusoidal or any arbitrary shape) generator, which is triggered by the current threshold set in the microprocessor. The peak value of the generated square wave is higher than the peak of the normal sinusoidal AC power source to inject current from the DC capacitor into the distribution load system. The third component is the microprocessor controller, 60, electrically connected to the converter, to provide central digital control, line current signal processing, IGBT trigger logic generation and protection scheme implementation. The fourth component is the sampling and feedback module, 70, electrically connected to the microprocessor and junction, 26, which contains current sensors that convert the distributed load current signal into low-voltage signals feedback into the microprocessor.

In the method of the present invention, a power source, 22, provides direct current to a conversion means 24, which transforms the direct current into alternating current. The alternating current is transmitted by some transmission means, 25, to a DER junction, 26, which is connected to a power distribution system, 30, which requires the alternating current. The magnitude of the alternating current required by the power distribution is continuously sampled and measured using the sampling/feedback module, 70, and when the magnitude is higher than a preset threshold value, as determined using a microprocessor control unit, 60, the microprocessor control unit triggers a single or multiphase converter, 50, to generate supplemental alternating current using direct current from an energy storage device, 40, and transmits that supplemental alternating current to the DER junction.

Figure 2:
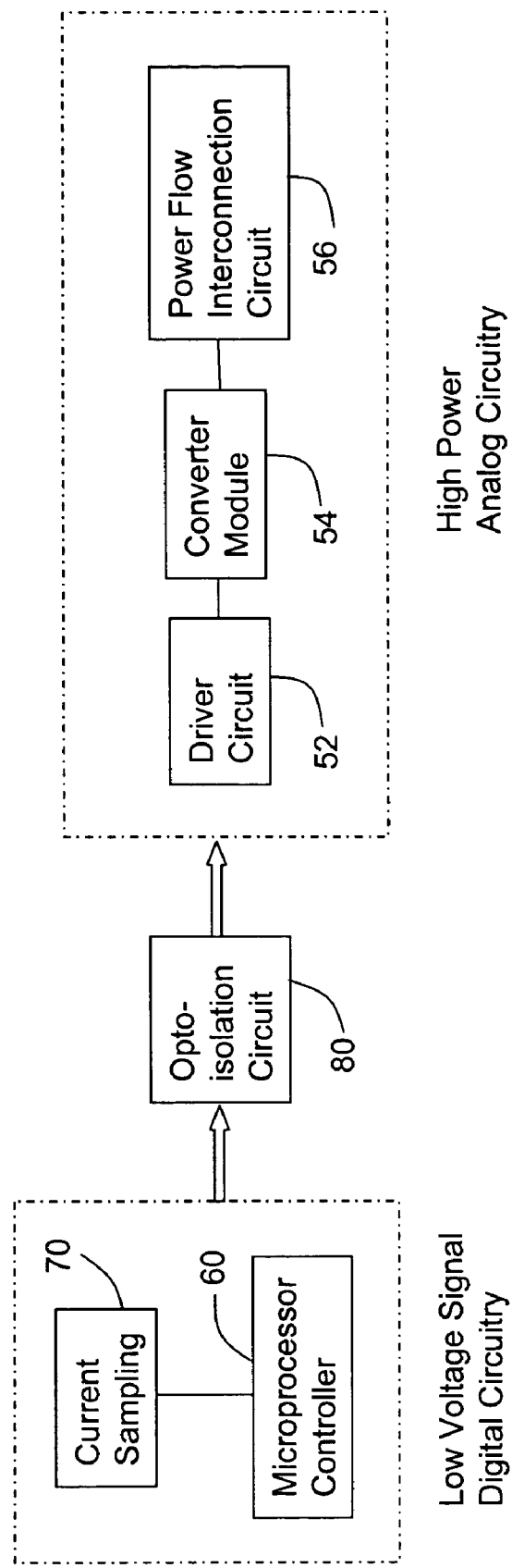
FIG. 2 illustrates the overall SPCS circuitry.

The major power conversion stage of the SPCS is a single or multiphase converter, 50, which employs in one embodiment six high power IGBTs (or IGBT modules) as the main switching components. Besides this main power circuit, other auxiliary circuits, such as current sampling and signal isolation, are also employed to fulfill the design requirements. The overall SPCS circuitry is divided into two major parts: low voltage signal digital circuitry that is responsible for the signal sampling and processing, and high power analog circuitry, which deals with the power conversion task. FIG. 2 shows that an opto-isolation circuit, 80, is used in between the low voltage signal digital circuitry for the sampling component, 70, and the microprocessor component, 60, and the high power analog circuitry related to the single or multiphase converter, 50. The high power analog circuitry includes in one embodiment an IGBT driver circuit, 52, single or multiphase converter, 54, and a power flow interconnection circuit, 56. Opto-isolation circuit is necessary to eliminate the noise and interference between the analog high power circuit and digital controller unit. The purpose of implementing an isolation circuit is to prevent the voltage and current spike from interfering and damaging the low power rating signal devices, such as microprocessor.

The basic function of the single or multiphase converter is to chop the DC bus voltage in such a manner that the short-pulse current can be injected from the DC capacitor into the AC side distributed load. To have balanced AC output, six IGBTs in one embodiment are configured in three half-bridges and each of the bridge legs generates the corresponding phase output. Similar configurations can be used with MOSFETs or other like devices.

The purpose of implementing current sensors in the SPCS design is to monitor the DER's load current and feed back the current information into the microcontroller for processing and subsequent generation of trigger pulses of the power semiconductor device. Thus, it is important to capture the current signals in a fast and accurate way. Other than that, to simplify the software algorithm processed by microprocessor, the current sensor should have a linear voltage output with the current input. As the Kirchhoff's Current Law applies, during the SPCS triggering period, the total current projected from the DER system into the distributed load should be the sum of DER current and SPCS current, since these two devices are connected in parallel.

The microprocessor controls the SPCS system. As the central control unit, the microprocessor is responsible for processing the load current signal by comparing it with the threshold value and generating low frequency pulse width modulation (PWM) pulses to fire the IGBT module (although IGBTs are discussed, other power semiconductor devices can also be used). Besides this basic function, the microprocessor itself has to be programmed with other features, such as self-adaptation, motor pattern recognition, noise repression and temperature monitoring, to make it capable to fulfill the various system requirements.

In one embodiment, the central control unit is organized into eight different functional blocks using assembly code language to control the SPCS. One functional block is responsible for starting up the microprocessor by arranging the special registers, user-configured register, interrupts and initializes the peripheral devices, like A/D conversion, counter and timer, and I/O ports. A second block controls current signal sampling and analog to digital (A/D) conversion. A third block allows automatic loading into the microprocessor of a 10-bit binary value of the current threshold setting. A fourth block is the central data processing unit that compares the input current signals with the threshold value and therefore generates original PWM drive signals to the IGBT. A fifth block is the converter triggering routine that controls the deadtime of the each phase's drive signal and prevents the cross-conduction caused by the phase shift. A sixth block enables the microprocessor to learn and memorize the motor current pattern in a distribution system by using the static data storage technology. A seventh block relates to self-adaptation and noise suppression where the microprocessor can be self-adjusted to fit the offset of external analog device to avoid sampling errors and high frequency noise in the ground loop. The eighth block relates to temperature monitoring and display, monitoring the IGBT case temperature and displaying the temperature on an output panel.

The comparison block takes the output from the second block (the A/D conversion routine) and compares it with the external threshold setting from the third block. If the external threshold setting is exceeded, the fifth block generates IGBT firing pulses with dead-time control and phase shift.

The basic trigger algorithm for a one or multi-phase converter using a power semiconductor device (such as an IGBT, MOSFET or other like device) in the converter module connected in the form of a bridge is to 1) determine the phase load current; 2) determine if the phase load current is higher (a positive threshold) or lower (a negative threshold) than the pre-determined external threshold setting; 3) if a positive threshold, then activate the power semiconductor device connected to the phase in the upper part of the bridge to obtain supplemental current; and 4) if a negative threshold, then activate the power semiconductor device connected to the phase in the lower part of the bridge to close the loop, thereby not obtaining supplemental current. With this triggering algorithm, the power semiconductor devices serve to provide additional current when needed but only when needed.

The trigger algorithm should also include dead-time control and phase shift up to 100 μS to prevent the cross conductions the power semiconductor device, which can cause a short-circuit failure in the normal operation.

The eighth block relates to the IGBT module temperature and is a critical factor to the system reliability. This routine performs two functions: first, it samples the temperature value from a positive-temperature-coefficient resister (PTC) integrated inside the IGBT chip and displays it on a 2-digit 7-segment LED panel; second, it checks the IGBT case temperature with the maximum allowable value, and takes action to shut down the whole SPCS system in case of over-temperature.

An important aspect of the proposed SPCS solution is that the converter operates for only a very short period, usually less than one second and generally less than 10 secs. Therefore, it is possible to design a very economical system in terms of using low-current-rating IGBT devices in high power application with careful thermal analysis and optimized heat sink design.

Thermal analysis is also a fundamental issue in the power inverter design, because the high temperature is the major factor that affects the system reliability due to a variety of physical failure mechanisms that involve thermal stresses and material degradation. Therefore, it is important to understand the thermal behavior of IGBT module and to keep the IGBT junction temperature below the maximum admissible value, such as by incorporating an associated heat sink.

To validate the proposed SPCS system solution in the hardware platform, a fabricated SPCS converter was tested under certain load conditions. In the real testing bench, a 175 W three-phase induction motor with other resistive and inductive loads was used to simulate the actual distributed load under 500 watts. A three-phase AC power supply with current limitation at six amperes was used as the substitute to a real DER system with transient loadability problem. The major concern of the testing result was to verify that during the overload period (when induction motor starts), the output currents from the DER should not exceed the current limitation threshold, and the excessive part of the currents has to be compensated by the SPCS converter. The current waveforms of DER, load and SPCS were recorded.

The testing results showed that, during the overload period when the motor starts, the SPCS was triggered to project certain amount of current into the system, so that the currents from the DER side were chopped to be maintained below the threshold value.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

We claim:

1. A power transmission system, comprising:
    a direct current power source electrically connected to a conversion device for converting direct current into alternating current, said conversion device electrically connected to a power distribution system through a junction;
    an energy storage device capable of producing direct current connected to a converter means, said converter means capable of converting direct current into alternating current and electrically connected to said junction; and
    a microprocessor controller connected to a sampling and feedback module, said sampling and feedback module in electrical communication with an alternating current load at said junction and capable of measuring the alternating current load at said junction.

2. The power transmission system of claim 1 wherein said direct current power source is selected from the group consisting of a fuel cell, a photovoltaic system, a wind turbine, a microturbine, a Stirling engine, a combustion turbine, a battery, a fly-wheel, a superconducting magnetic energy storage system, an electrochemical capacitor, and a compressed air system.

3. The power transmission system of claim 1 wherein said conversion device is selected from the group consisting of a static power converter, a rotating power converter, and a hybrid power converter.

4. The power transmission system of claim 1 wherein said energy storage device is selected from the group consisting of a battery, a fly-wheel, a superconducting magnetic energy storage system, and a capacitor.

5. The power transmission system of claim 1 wherein said converter means comprises a power semiconductor device selected from the group consisting of an insulated gate bipolar transistor, a metal oxide semiconductor field-effect transistor, and a gate turnoff thyristor.

6. The power transmission system of claim 5 wherein said converter means comprises six insulated gate bipolar transistor modules.

7. The power transmission system of claim 6 wherein said converter means operates at 60 Hertz.

8. The power transmission system of claim 7 wherein said converter means generates a square wave.

9. The power transmission system of claim 6 where said insulated gate bipolar transistor modules are single phase.

10. The power transmission system of claim 6 where said insulated gate bipolar transistor modules are three-phase.

11. The power transmission system of claim 1 further comprising an opto-isolation circuit electrically connecting said microprocessor controller and said converter means.

12. The power transmission system of claim 1 further comprising a heat sink thermally connected to said converter means.

13. The power transmission system of claim 1 wherein said microprocessor controller comprises software means for performing at least one function selected from the group consisting of microprocessor start-up, signal sampling, loading of a current threshold setting, comparison of input current signals with said current threshold setting, triggering said converter means, data noise suppression, and monitoring of the converter means temperature.

14. The power transmission system of claim 1 wherein said power transmission system has a power output less than one megawatt.

* * * * *